(12) United States Patent
Petculescu et al.

(10) Patent No.: US 6,493,718 B1
(45) Date of Patent: Dec. 10, 2002

(54) ADAPTIVE DATABASE CACHING AND DATA RETRIEVAL MECHANISM

(75) Inventors: Cristian Petculescu; Alexander Berger, both of Redmond; Amir Netz; Mosha Pasumansky, both of Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/419,437

(22) Filed: Oct. 15, 1999

(51) Int. Cl.[7] .................................................. G06F 17/30

(52) U.S. Cl. ..................................... 707/102; 707/104.1

(58) Field of Search ............................... 707/102, 1, 2, 707/3, 100, 104.1, 205

(56) References Cited

U.S. PATENT DOCUMENTS

| | | | | | |
|---|---|---|---|---|---|
| 5,943,668 | A | * | 8/1999 | Malloy et al. | 707/3 |
| 5,978,796 | A | * | 11/1999 | Malloy et al. | 707/3 |
| 6,122,636 | A | * | 9/2000 | Malloy et al. | 707/102 |
| 6,205,447 | B1 | * | 3/2001 | Malloy et al. | 707/102 |

* cited by examiner

Primary Examiner—Diane D. Mizrahi
(74) Attorney, Agent, or Firm—Woodcock Washburn LLP

(57) ABSTRACT

Systems, clients, servers, methods, and computer-readable media of varying scope are described in which, a data retrieval module of database client implements an aggressive caching scheme that seeks to predict what data cells will be needed to satisfy future queries. The data retrieval module applies an adaptive algorithm to dynamically determine the granularity of data to retrieve from a database server. The data retrieval module adaptively balances the benefit of satisfying future queries locally with the cost of retrieving larger data set from remote database server.

56 Claims, 4 Drawing Sheets

ADAPTIVE DATABASE CACHING AND DATA RETRIEVAL MECHANISM

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 1999, Microsoft, Inc.

FIELD

The present invention pertains generally to computer-implemented databases, and more particularly to an adaptive caching and data retrieval mechanism for multi-dimensional databases.

BACKGROUND

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Furthermore, OLAP services typically provide analytical tools to rank, aggregate, and calculate lead and lag indicators for the data under analysis.

An OLAP server is a high-capacity, multi-user data manipulation engine specifically designed to support and operate on multi-dimensional data structures. A multi-dimensional structure is arranged so that every data item is located and accessed based on the intersection of the dimension members which define that item. The design of the server and the structure of the data are optimized for rapid ad-hoc information retrieval in any orientation, as well as for fast, flexible calculation and transformation of raw data based on formulaic relationships.

A fundamental entity that is present in typical OLAP databases is a cube. A cube is a multidimensional representation of a set of data having varying aspects. A cube comprises a set of dimensions and a set of measures. In this context, a dimension is a structural attribute of the cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. Dimension members act as indices for identifying a particular cell or range of cells within a multidimensional array. A measure is a structural attribute of the cube that comprises a particular type of value that provides detail data for particular members within the dimensions. For example, sale amounts and units sold can be measures of a retail cube having a time dimension and a geography dimension. The measures provide the sale amounts and units sold for a particular geographic region at a particular point in time. For example, consider the following query:
   select
      time.members on columns,
      geography.members on rows,
      from sales.

In this query, time and geography are dimensions of the underlying database while sales in a measure. Conventional OLAP databases return a data set that does not include any calculated members that are within the range of the data set.

A calculated member is a member of a dimension whose value is determined from other members' values (e.g., by application of a mathematical or logical operation). Calculated members may be part of the OLAP server database or may have been specified by the user during an interactive session. This allows the user to customize the dimension tree by combining cube data, arithmetic operations, numbers and/or functions.

OLAP services are conventionally provided using a client-server model. An OLAP server is a high-capacity, multi-user data manipulation engine specifically designed to support and operate on multi-dimensional data structures. An OLAP client interfaces with the OLAP server, thereby providing OLAP services to external application programs. For example, an OLAP client may provide OLAP services to a variety of external application such as a data mining application, a data warehousing application, a data analysis application, a reporting application etc.

It is well known that retrieving data from a database server is costly with regards to memory consumption, input/output and network latency. Conventional client-server database systems have caching mechanisms that seek to minimize these costly server requests. There is a need in the art, however, for an adaptive caching mechanism that aggressively retrieves data in order to increase the probability that cached data will satisfy future database requests, thereby reducing the number of roundtrips to the OLAP server, yet weighs this benefit with the costs of high-volume database queries.

SUMMARY

The above-mentioned shortcomings, disadvantages and problems are addressed by the present invention, which will be understood by reading and studying the following specification. Systems, clients, servers, methods, and computer-readable media of varying scope are described in which.

The invention is directed toward a data retrieval software module that implements an aggressive caching mechanism that retrieves additional data with the expectation of satisfying future queries. The amount of additional data retrieved is based upon a cost benefit analysis that considers the costs of further retrieval versus the benefits of having the data ready for such future requests. The caching mechanism uses one or more probability schemes to predict which groups of data cells that will satisfy future queries and applies cost benefit policies to determine what granularity of data cells to retrieve.

More specifically, according to the invention upon receiving a query a database client determines a set of member sub-hierarchies for each dimension specified by the query that are suitable for satisfying the query. The client analyzes the costs and benefits of retrieving each member sub-hierarchies from the multidimensional database of the database server and selects one of the member sub-hierarchies for each dimension as a function of the analysis. Finally, the database client retrieves the selected member sub-hierarchies from the multidimensional database.

The present invention describes systems, clients, servers, methods, and computer-readable media of varying scope. In addition to the aspects and advantages of the present inven-

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

HARDWARE AND OPERATING ENVIRONMENT

Figure 1:
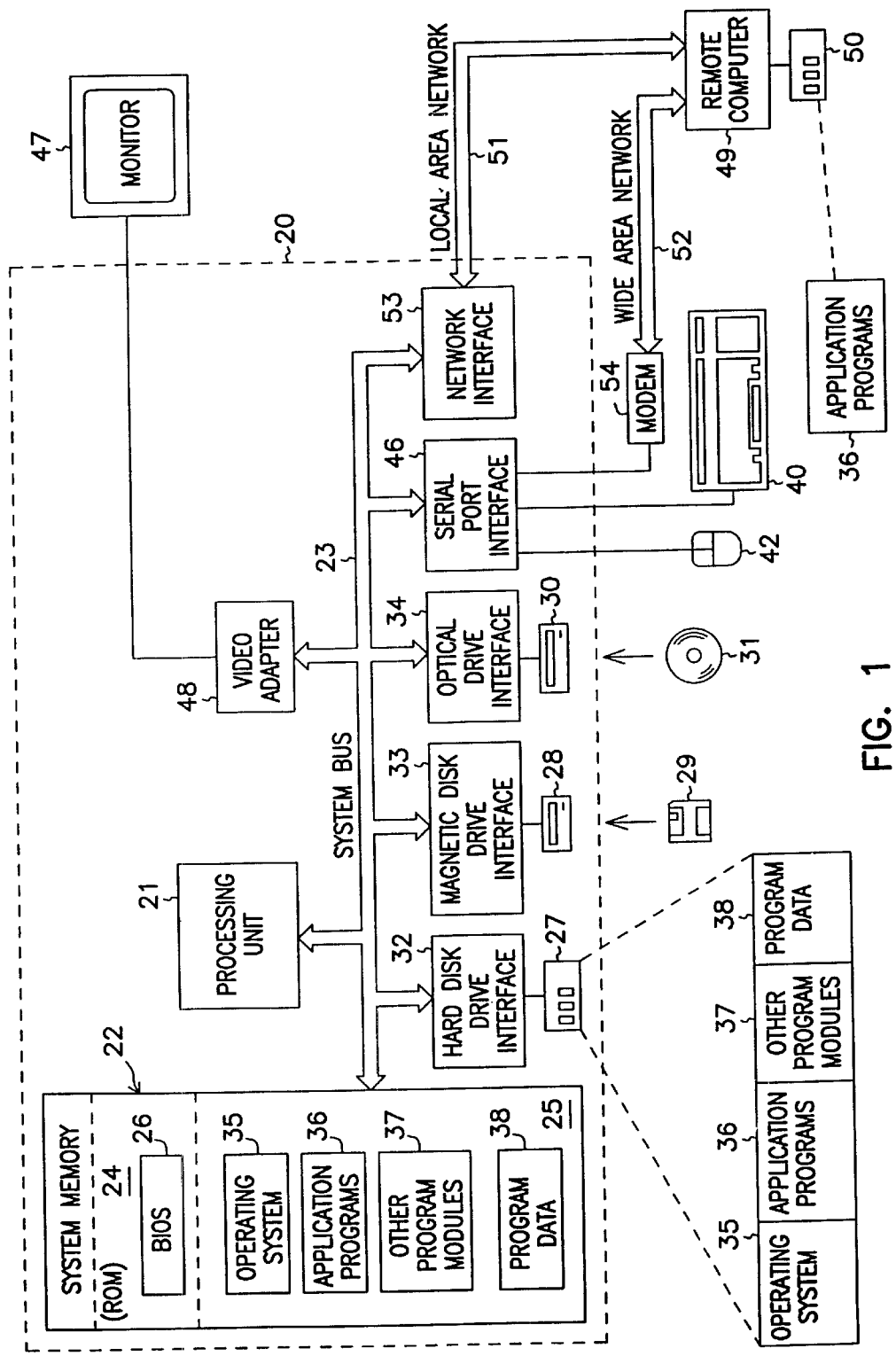
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

SYSTEM LEVEL OVERVIEW

Figure 2:
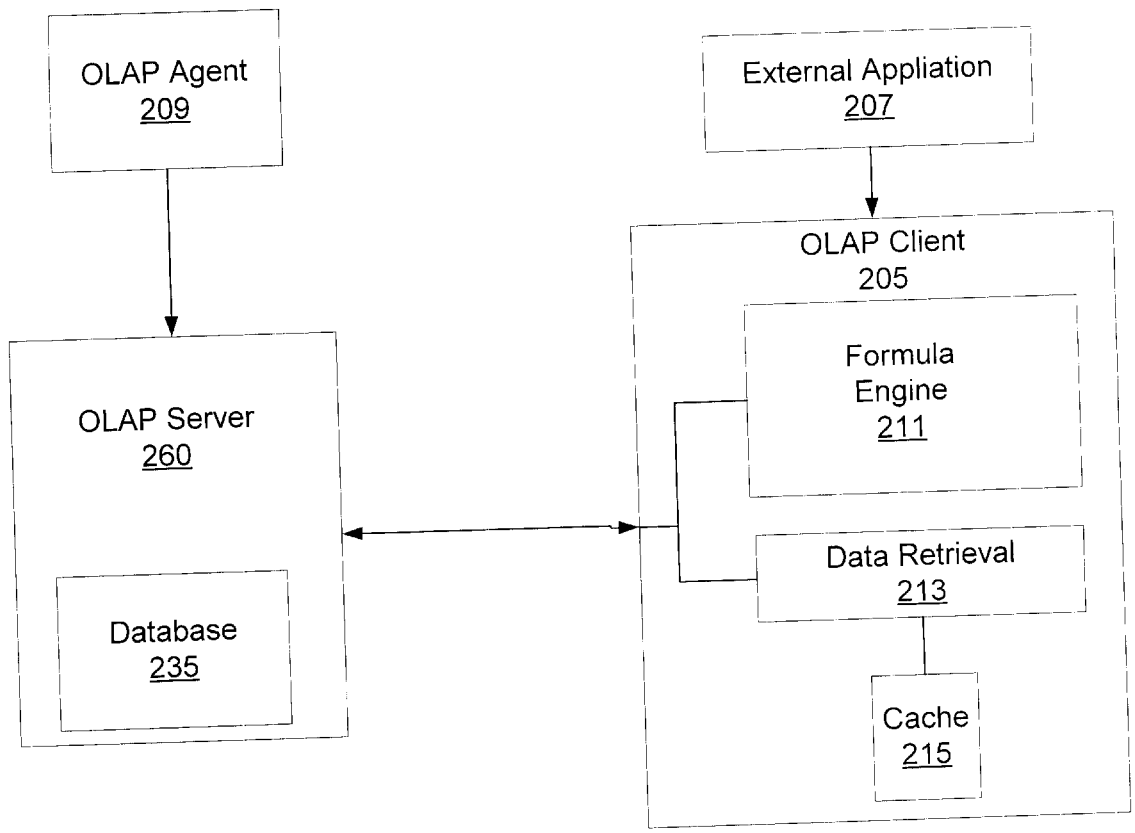
FIG. 2 is a block diagram illustrating a multidimensional database processing systems incorporating the present invention.

FIG. 2 is a block diagram illustrating a multidimensional database processing systems 200 incorporating the present invention. The operating environment includes an OLAP client 205, OLAP server 260, OLAP agent 209 and one or more external software applications 207. The concepts of the invention are described as operating in a distributed, multiprocessing, multithreaded operating environment provided by one or more computers, such as computer 20 in FIG. 1.

OLAP Server 260 provides OLAP services to one or more clients, such as OLAP client 205. In one embodiment of the invention, the OLAP server 260 is a version of the SQL Server OLAP Services product from Microsoft Corporation. However, the invention is not limited to any particular OLAP server product, as those of skill in the art will appreciate.

External application 207 represents an application program that requires the services of an OLAP system. Application 207 can be any type of application that interacts with the OLAP system 200, for example, a data mining application, a data warehousing application, a data analysis application, a reporting application etc. Application 207 typically interacts with OLAP server 260 by issuing OLAP queries to OLAP client 205. Formula engine 211 within OLAP client 205 parses, binds and executes the query by issuing the query to OLAP server 260. In one embodiment of the invention, OLAP client 205 includes a local cache 215 such that data retrieval module 213 determines whether requested data cells have been previously cached in a local cache 215. If so, formula engine 211 does not issue the query to OLAP server 260. Instead, the cell data is retrieved from cache 215 and returned to application 207, thereby eliminating the time and resource expense required to obtain the cell data from the OLAP server 260. In addition, the newly received cell data is cached in local cache 215 for potential later use.

In one embodiment of the invention, OLAP server 260 includes database 235 that represents data stored in a relational format on a persistent storage device such as hard disk drive 27 of FIG. 1. Examples of such databases include, but are not limited to SQL Server, Oracle, Sybase, Informix etc. Database 235 is a multidimensional database having dimensions and measures as described above.

According to the invention, data retrieval module 213 of OLAP client 205 implements an aggressive caching scheme that seeks to predict what data cells will be needed to satisfy future queries from application 207. Data retrieval module 213 applies an adaptive algorithm to dynamically determine the granularity of data to retrieve from OLAP server 260. Data retrieval module 213 adaptively balances the benefit of satisfying future queries locally with the cost of retrieving larger data set from remote database server 260. A system level overview has been described in which a multidimensional database processing systems incorporates the present invention.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIG. 3. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIG. 3 are inclusive of the acts required to be taken by an operating environment executing an exemplary embodiment of the invention.

Figure 3:
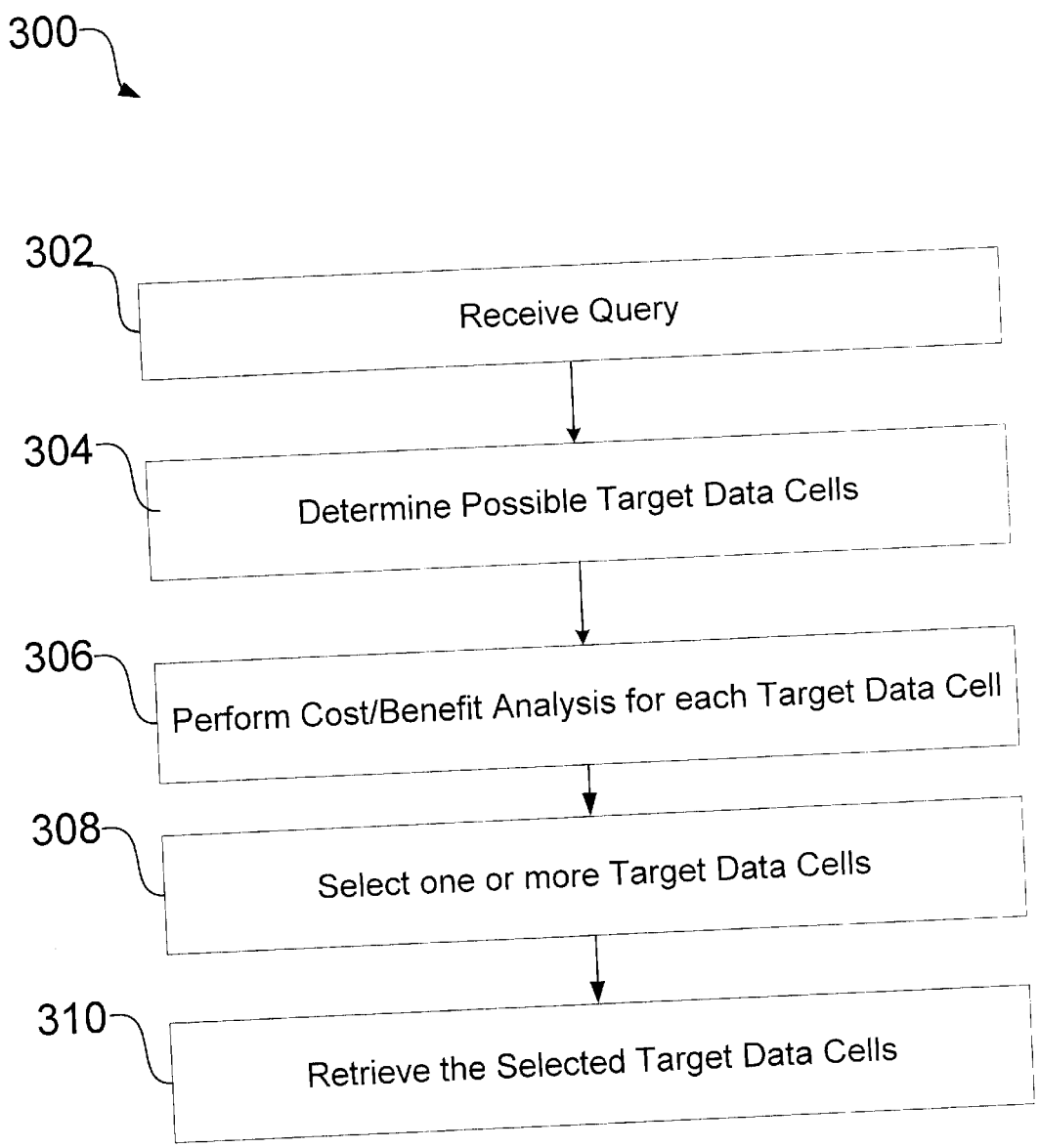
FIG. 3 is a flow chart illustrating one method of operation by which the multidimensional database system implements an adaptive caching scheme that performs a cost/benefit analysis in determining what data to retrieve from the a database server in order to satisfy the present query and likely future queries.

FIG. 3 is a flow chart 300 illustrating one method of operation by which According to the invention, data retrieval module 213 of OLAP client 205 implements an aggressive caching scheme that seeks to predict what data cells will be needed to satisfy future queries from application 207 and dynamically determines the granularity of data to retrieve from OLAP server 260.

In block 302, OLAP server 260 of database system 200 receives a query from external application 207. A typical query specifies one or more target data cells within one or more dimensions of the multidimensional database. For example, consider a data cube that holds sales information and includes: (1) geography and sales representatives as dimensions, and (2) net sales and volume are measures. In this fashion, the combination of a particular measure (e.g. Sales) with a particular representative member and a particular geography member specify a data cell having a value that represents unit sales. Each dimension of data cube can be represented as a hierarchical parent-child tree. For example, FIG. 4 is a block diagram illustrating the two dimensions as hierarchical parent-child trees.

Figure 4:
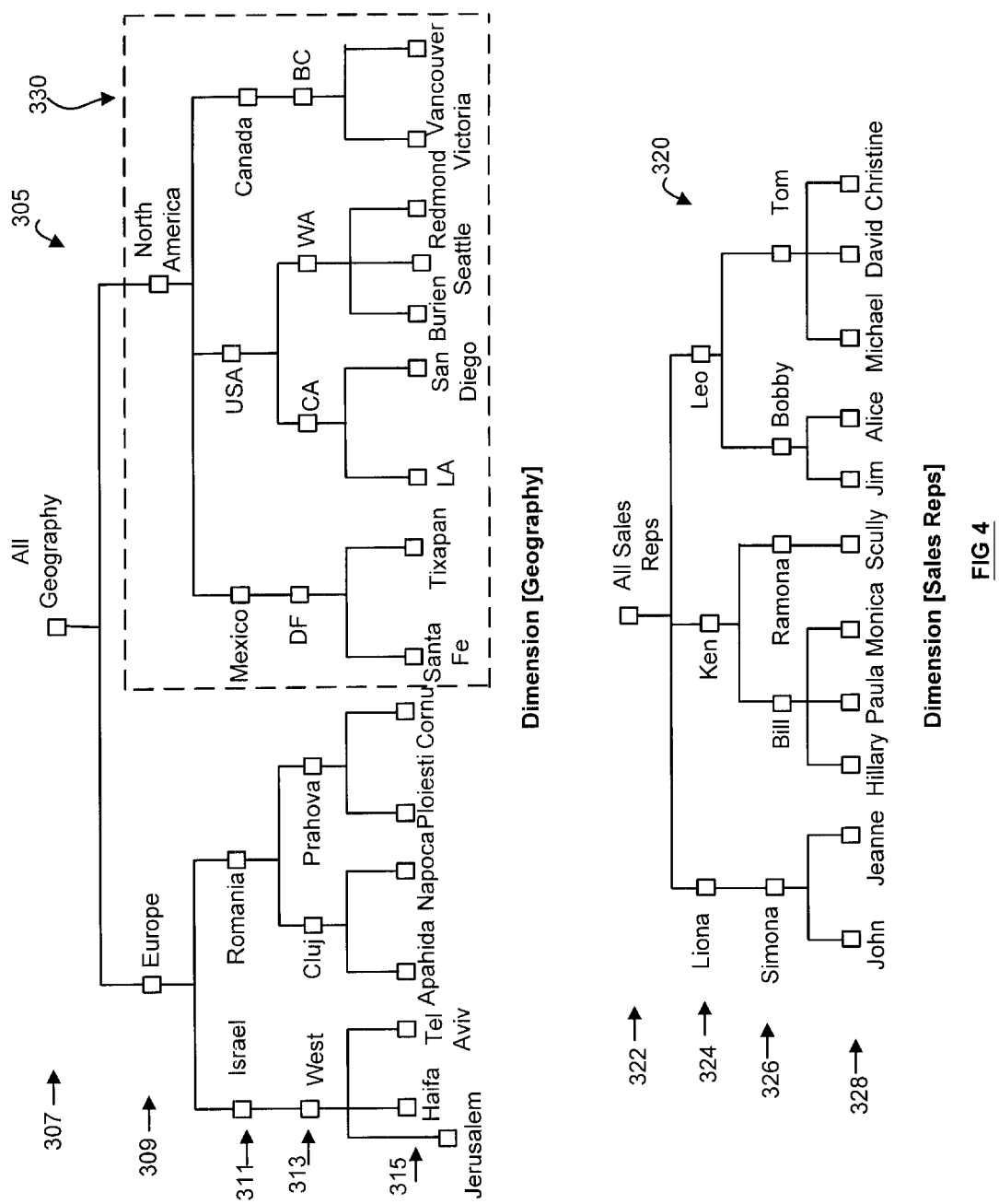
FIG. 4 is a block diagram illustrating two dimensions of a multidimensional database as hierarchical parent-child trees.

As illustrated in FIG. 4, the geography dimension 405 has five levels: All 407, Region 409, Country 411, Province 413 and City 415. Sales representatives dimension 420 has four levels: All 422, Top Level Manager 424, Lower Level Manager 426 and Sales Representative 428. Each dimension hierarchy comprises a plurality of member sub-hierarchies. For example, member sub-hierarchy 430 of the Geography dimension 405 includes Mexico, Mexico's descendants, siblings USA and Canada and their descendants. North America can be calculated by aggregating member sub-hierarchy 430. A sub-hierarchy, however, need not be a complete hierarchy but may contain only members of a having a common level. Application 407 may request sales information for USA for all sales representatives by issuing the following query:

select
    representatives.members on columns,
    {[USA] }on rows,
  from sales.

Referring again to FIG. 3, for each dimension specified in the query, such as the geography and representative dimensions in the above example, data retrieval module 213 determines all possible member sub-hierarchies that can be retrieved from OLAP server 260 and which are sufficient for satisfying the query received from application 207, i.e., which can be used to provide the data specifically requested by the query. For example, a query requested sales information for USA could be satisfied by retrieving the member USA, or by retrieving and aggregating Washington and California, or by even retrieving and aggregating the descendants of Washington and California. These dimensions delimit the set of data cells that are likely to be requested by application 207 in the future. In other words, the set of possible member sub-hierarchies to retrieve from OLAP server 260 is bound these dimensions. The unique combinations of each member of the representative dimension with each member of the sales dimension defines the member sub-hierarchy solution space.

In block 306 data retrieval module 213 performs a cost/benefit analysis for each member sub-hierarchy identified in block 304. Data retrieval module 213 uses this cost benefit analysis to determine the granularity of the member sub-hierarchy to retrieve from OLAP server 260. More specifically, the data retrieval module weighs the benefit and potential of satisfying future queries with cached data from cache 215 versus the cost of retrieving more data cells from OLAP server 260. In making this decision, data retrieval module determines whether to (1) retrieve just the data cells specified by the query, (2) retrieve a member sub-hierarchy that includes the specified cells plus descendants so as to increase the likelihood of satisfying future queries or (3) retrieve a member sub-hierarchy that includes just the descendants so that the requested data cells can be calculated by aggregating their respective descendants. In one embodiment, data retrieval module employs a back-tracking algorithm to limit the solution space and, therefore, need not calculate every possible solution.

In performing this cost/benefit analysis, data retrieval module 213, in one embodiment, generates a target table for each dimension identified by the query in order to adaptively and dynamically identify the member sub-hierarchies to retrieve. The target table includes a plurality of cells organized as rows and columns. Each row represent levels column the dimension's member hierarchy while each column represents the ancestor relationships within the hierarchy. In this fashion, each cell of the target table represents a member sub-hierarchy within the dimension's hierarchy and includes two numbers: a total number of members (T) and a necessary, or useful, number (N) of members that are necessary to satisfy the query received from application 207. Thus, for a cell (A,B) within the target table T equals the total number of descendants at level B for the target data cell's ancestor at level A. N equals the number of these members that are necessary to satisfy the query.

Table 1 illustrates one embodiment of the target table generated in block 306 for a dimension hierarchy having C levels where the requested data cell falls within level L. The columns range from 0 to L while the rows range from L to C. Cell (L, L) represents the single data cell requested by the query and, therefore, T equals 1 and N equals 1. Cell (0,C) represents the entire dimension. The total number of cells within the target table can be calculated by $(L+1)*(C-L+1)$.

TABLE 1

| P/T | 0 | 1 | ... | L |
|---|---|---|---|---|
| L | | | | 1/1 |
| L + 1 | | | | |
| . | | | | |
| . | | | | |
| . | | | | |
| C | | | | |

To further illustrate this concept, consider the following query that uses the geography dimension:

select {[USA, CA, LA, San Diego, WA, BC]} on columns
  . . .

Table 2 illustrates one embodiment of the target table generated in block 306 for the geography dimension in the context of this example query. Here, assuming the user requests the USA data cell, L equals 3 (USA falls within the third level of the hierarchy) and C equals 5 (the geography dimension hierarchy is five levels high). Thus, the columns of the generated target table range from 0 to 3 while the rows range from 3 to 5. Cell (3,3) represents the single data cell USA requested by the query.

TABLE 2

| P/T for USA | 0 | 1 (ALL) | 2 (Region) | 3 (Country) |
|---|---|---|---|---|
| 3 (Country) | 1/5 | 1/5 | 1/3 | 1/1 |
| 4 (Province) | 3/7 | 3/7 | 3/4 | 2/2 |
| 5 (City) | 2/16 | 2/16 | 2/9 | 2/5 |

Here, cell (2,4) contains the ratio 3/4 because USA's L2 ancestor (North America) has 4 L4 descendants (DF, CA, WA and BC). Of these 4 descendants 3 (CA, BC and WA) are specified by the query. Cell (1,5) contains the ratio 2/16 because at L5 (city level) there are 16 descendants of USA's LI ancestor (ALL). Of these 16 descendants two (LA and San Diego) are specified by the query. After constructing a target table for each dimension specified in the query, data retrieval module proceeds to block 308.

In block 308, data retrieval module 213 selects a member sub-hierarchy from each target table, i.e., for each dimension specified within the query. Generally speaking, data retrieval module 213 follows the following principles. The more cells that are retrieved, i.e., the higher the number T, the higher the chances that future queries will be satisfied via the retrieved data. Retrieving more cells, however, consumes more memory and introduces more server and network latency. The higher the sub-hierarchy retrieved, the longer the time and the more computing power necessary to calculate the requested data cell by aggregating its descendants.

Data retrieval module 213 balances these competing principles by applying one or more selection policies. In a first policy, referred to as the windowing policy, data retrieval module 213 seeks to retrieve only the data cells that application 207 will visibly display to a user. More specifically, the windowing policy considers the following criteria:

1. Maximum request area: the product of the number of useful members requested in every dimension.
2. Minimum request perimeter: the product of the total members requested in every dimension.
3. Local usefulness ratio: a ratio for each cell of the target table calculated by dividing the useful members by the total members. The windowing policy requires that this ratio be greater than a particular threshold, as for example 50%, although other thresholds can also be used.
4. Global usefulness ratio: the product of the local ratios. The windowing policy requires that this ratio be greater than 50%.
5. Virtual pyramid height: the height of the sub-hierarchy to be retrieved such that the target data cell specified by the query can be calculated. The windowing policy requires that this value be less than a particular value, as for example 50, although other values can also be used.

In a second policy, referred to as the all-scan policy, data retrieval module 213 seeks to retrieve all the data cells defined by the query (i.e. resulted by intersection of query axes). Here, data retrieval module 213 considers the maximum request area defined above plus the allotted size of cache 215.

In a second policy, referred to as the isolated policy, is intended for use when application 207 desires to retrieve data in isolated mode. Here, data retrieval module 213 considers only the maximum request area defined above, as in the all-scan policy, but without consideration for the allotted size of cache 215.

Once the member sub-hierarchies to be retrieved have been selected (block 308), data retrieval module 213 issues the query to OLAP server 260 and retrieves the encompassed cells (block 310). OLAP client 205 returns the data specifically requested by the query to application 207 and stores the data, and any additional data retrieved from OLAP server 260, in cache 215 for satisfying future queries.

CONCLUSION

Various embodiments of a multi-dimensional database system have been described in which a data retrieval module of database client implements an aggressive caching scheme that seeks to predict what data cells will be needed to satisfy future queries. The data retrieval module of the database client applies an adaptive algorithm to dynamically determine the granularity of data to retrieve from a database server. The data retrieval module adaptively balances the benefit of satisfying future queries locally with the cost of retrieving larger data set from remote database server. In one embodiment a two-dimensional target table is generated for each dimension in order to perform the cost-benefit analysis and to determine which member sub-hierarchy to retrieve for the dimension. The data retrieval module applies one or more policies to the target table in making this decision and considers a variety of criteria including the maximum requested area, the minimum request perimeter, a local usefulness ratio, a global usefulness ratio, the height of each possible member sub-hierarchy and the allotted cache size. It is intended that only the claims and equivalents thereof limit this invention.

We claim:

1. A computerized method for processing a query directed to a multidimensional database comprising:
   for each dimension specified by the query, determining a set of member sub-hierarchies suitable for satisfying the query;
   analyzing costs and benefits of retrieving the member sub-hierarchies from the multidimensional database;
   selecting one of the member sub-hierarchies for each dimension as a function of the analysis; and
   retrieving the selected member sub-hierarchies from the multidimensional database.

2. The computerized method of claim 1, wherein determining a set of member sub-hierarchies includes identifying those member sub-hierarchies that encompass a member specified by the query.

3. The computerized method of claim 1, wherein determining a set of member sub-hierarchies includes identifying those member sub-hierarchies from which the member specified by the query can be calculated.

4. The computerized method of claim 1, wherein determining the set of member sub-hierarchies includes generating combinations of each member of each dimension specified by the query.

5. The computerized method of claim 1, wherein determining the set of member sub-hierarchies includes generating a target table for each dimension of the database specified by the query, wherein the target table has a plurality of cells organized in a rows and columns, and further wherein each cell of the target table corresponds to a member sub-hierarchy within a dimension of the database.

6. The computerized method of claim 5, wherein the columns of the table represent hierarchical relationships of the dimension of the database.

7. The computerized method of claim 1, wherein analyzing the costs and the benefits includes for each identified member sub-hierarchy calculating a total number of data cells (T) including the corresponding member sub-hierarchy and all descendants of the member sub-hierarchy.

8. The computerized method of claim 7, wherein analyzing the costs and the benefits includes calculating for each identified member sub-hierarchy a corresponding number of necessary data cells (N) cells that fall within the total number of data cells (T) and that are required to satisfy the query.

9. The computerized method of claim 1, wherein analyzing the costs and the benefits includes calculating a cost-benefit ratio for each member sub-hierarchy.

10. The computerized method of claim 8, wherein analyzing the costs and the benefits includes calculating a cost-benefit ratio for each member sub-hierarchy, and further wherein the cost-benefit ratio equals N/T.

11. The computerized method of claim 10, wherein selecting one or more of the member sub-hierarchies includes rejecting the member sub-hierarchies having a corresponding ratio less than a predefined threshold.

12. The computerized method of claim 1, wherein selecting one or more of the member sub-hierarchies is a function of cache memory available on a database client.

13. The computerized method of claim 1, wherein selecting one or more of the member sub-hierarchies includes applying a predefined policy.

14. The computerized method of claim 13, wherein applying a predefined policy includes selecting member sub-hierarchies approximating those data cells visibly displayed by a software application.

15. The computerized method of claim 13, wherein applying a predefined policy includes selecting member sub-hierarchies in order to maximize the data cells retrieved.

16. The computerized method of claim 13, wherein applying a predefined policy includes selecting member sub-hierarchies as a function of an allotted cache size.

17. The computerized method of claim 13, wherein applying a predefined policy includes selecting member sub-hierarchies in an isolation mode without limitation of an allotted cache size.

18. The computerized method of claim 1, wherein retrieving data from the database includes retrieving data from an OLAP server via an OLAP client.

19. A computer-readable medium having computer-executable instructions for performing a method for processing a query directed to a multidimensional database, the method comprising:
   for each dimension specified by the query, determining a set of member sub-hierarchies suitable for satisfying the query;
   analyzing costs and benefits of retrieving the member sub-hierarchies from the multidimensional database;
   selecting one of the member sub-hierarchies for each dimension as a function of the analysis; and
   retrieving the selected member sub-hierarchies from the multidimensional database.

20. The computer-readable medium of claim 19, wherein determining a set of member sub-hierarchies includes identifying those member sub-hierarchies that encompass a member specified by the query.

21. The computer-readable medium of claim 19, wherein determining a set of member sub-hierarchies includes identifying those member sub-hierarchies from which the member specified by the query can be calculated.

22. The computer-readable medium of claim 19, wherein determining the set of member sub-hierarchies includes generating combinations of each member of each dimension specified by the query.

23. The computer-readable medium of claim 19, wherein determining the set of member sub-hierarchies includes generating a target table for each dimension of the database specified by the query, wherein the target table has a plurality of cells organized in a rows and columns, and further wherein each cell of the target table corresponds to a member sub-hierarchy within a dimension of the database.

24. The computer-readable medium of claim 23, wherein the columns of the table represent hierarchical relationships of the dimension of the database.

25. The computer-readable medium of claim 19, wherein analyzing the costs and the benefits includes for each identified member sub-hierarchy calculating a total number of data cells (T) including the corresponding member sub-hierarchy and all descendants of the member sub-hierarchy.

26. The computer-readable medium of claim 25, wherein analyzing the costs and the benefits includes calculating for each identified member sub-hierarchy a corresponding number of necessary data cells (N) cells that fall within the total number of data cells (T) and that are required to satisfy the query.

27. The computer-readable medium of claim 19, wherein analyzing the costs and the benefits includes calculating a cost-benefit ratio for each member sub-hierarchy.

28. The computer-readable medium of claim 26, wherein analyzing the costs and the benefits includes calculating a cost-benefit ratio for each member sub-hierarchy, and further wherein the cost-benefit ratio equals N/T.

29. The computer-readable medium of claim 19, wherein selecting one or more of the member sub-hierarchies includes rejecting the member sub-hierarchies having a corresponding ratio less than a predefined threshold.

30. The computer-readable medium of claim 19, wherein selecting one or more of the member sub-hierarchies is a function of cache memory available on a database client.

31. The computer-readable medium of claim 19, wherein selecting one or more of the member sub-hierarchies includes applying a predefined policy.

32. The computer-readable medium of claim 31, wherein applying a predefined policy includes selecting member sub-hierarchies approximating those data cells visibly displayed by a software application.

33. The computer-readable medium of claim 31, wherein applying a predefined policy includes selecting member sub-hierarchies in order to maximize the data cells retrieved.

34. The computer-readable medium of claim 31, wherein applying a predefined policy includes selecting member sub-hierarchies as a function of an allotted cache size.

35. The computer-readable medium of claim 31, wherein applying a predefined policy includes selecting member sub-hierarchies in an isolation mode without limitation of an allotted cache size.

36. The computer-readable medium of claim 19, wherein retrieving data from the database includes retrieving data from an OLAP server via an OLAP client.

37. A computerized system comprising:
   a processor and a computer-readable medium;
   an operating environment executing on the processor from the computer-readable medium; and
   a database client executing within the operating environment for interfacing with a database server having a multidimensional database, wherein an OLAP client processes a database query by:
      determining a set of member sub-hierarchies for each dimension specified by the query that are suitable for satisfying the query;
      analyzing costs and benefits of retrieving the member sub-hierarchies from the multidimensional database of the database server;
      selecting one of the member sub-hierarchies for each dimension as a function of the analysis; and
      retrieving the selected member sub-hierarchies from the multidimensional database.

38. The computerized system of claim 37, wherein determining a set of member sub-hierarchies includes identifying those member sub-hierarchies that encompass a member specified by the query.

39. The computerized system of claim 37, wherein determining a set of member sub-hierarchies includes identifying those member sub-hierarchies from which the member specified by the query can be calculated.

40. The computerized system of claim 37, wherein determining the set of member sub-hierarchies includes generating combinations of each member of each dimension specified by the query.

41. The computerized system of claim 37, wherein determining the set of member sub-hierarchies includes generating a target table for each dimension of the database specified by the query, wherein the target table has a plurality of cells organized in a rows and columns, and further wherein each cell of the target table corresponds to a member sub-hierarchy within a dimension of the database.

42. The computerized system of claim 41, wherein the columns of the table represent hierarchical relationships of the dimension of the database.

43. The computerized system of claim 37, wherein analyzing the costs and the benefits includes for each identified member sub-hierarchy calculating a total number of data cells (T) including the corresponding member sub-hierarchy and all descendants of the member sub-hierarchy.

44. The computerized system of claim 43, wherein analyzing the costs and the benefits includes calculating for each identified member sub-hierarchy a corresponding number of necessary data cells (N) cells that fall within the total number of data cells (T) and that are required to satisfy the query.

45. The computerized system of claim 37, wherein analyzing the costs and the benefits includes calculating a cost-benefit ratio for each member sub-hierarchy.

46. The computerized system of claim 44, wherein analyzing the costs and the benefits includes calculating a cost-benefit ratio for each member sub-hierarchy, and further wherein the cost-benefit ratio equals N/T.

47. The computerized system of claim 46, wherein selecting one or more of the member sub-hierarchies includes rejecting the member sub-hierarchies having a corresponding ratio less than a predefined threshold.

48. The computerized system of claim 37, wherein selecting one or more of the member sub-hierarchies is a function of cache memory available on a database client.

49. The computerized system of claim 37, wherein selecting one or more of the member sub-hierarchies includes applying a predefined policy.

50. The computerized system of claim 49, wherein applying a predefined policy includes selecting member sub-hierarchies approximating those data cells visibly displayed by a software application.

51. The computerized system of claim 49, wherein applying a predefined policy includes selecting member sub-hierarchies in order to maximize the data cells retrieved.

52. The computerized system of claim 49, wherein applying a predefined policy includes selecting member sub-hierarchies as a function of an allotted cache size.

53. The computerized system of claim 49, wherein applying a predefined policy includes selecting member sub-hierarchies in an isolation mode without limitation of an allotted cache size.

54. The computerized system of claim 37, wherein the database is a relational database system.

55. The computerized system of claim 37, wherein the database server is an OLAP server.

56. The computerized system of claim 37, wherein the database client is an OLAP client.

* * * * *